Figure 1:
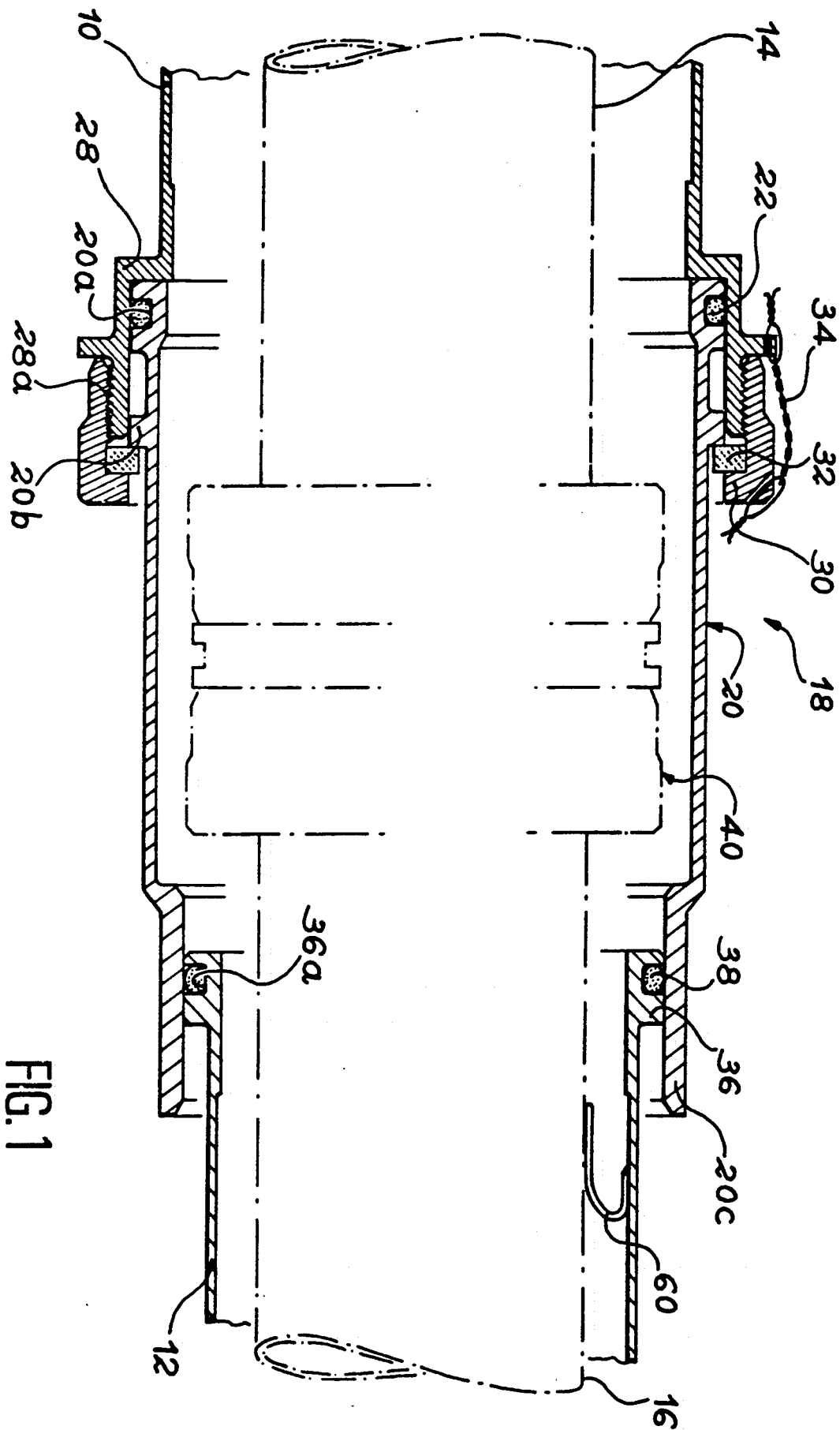

United States Patent [19]

Porte

[11] Patent Number: 5,011,193
[45] Date of Patent: Apr. 30, 1991

[54] DEVICE FOR THE TIGHT, DISMANTLABLE COUPLING OF TWO TUBES, PARTICULARLY FOR A FUEL TRANSFER INSTALLATION

[75] Inventor: Alain Porte, Colomiers, France

[73] Assignee: Aerospatiale Societe Nationale Industrielle, France

[21] Appl. No.: 440,712

[22] Filed: Nov. 22, 1989

[30] Foreign Application Priority Data

Nov. 25, 1988 [FR] France ............... 88 15413

[51] Int. Cl.⁵ ............................................. F16L 39/04
[52] U.S. Cl. ................... 285/31; 285/133.1; 285/175; 285/302; 285/354
[58] Field of Search ............... 285/31, 32, 302, 185 A, 285/354, 348, 133.1, 138, 175

[56] References Cited

U.S. PATENT DOCUMENTS

| | | | |
|---|---|---|---|
| 896,204 | 8/1908 | Glauber | 285/348 X |
| 1,912,299 | 5/1933 | Parker | 285/354 X |
| 3,451,698 | 6/1969 | Chakroff | 285/302 X |
| 3,847,421 | 11/1974 | Eschbaugh et al. | 285/354 X |
| 4,135,742 | 1/1979 | Anderson | 285/165 |
| 4,687,232 | 8/1987 | Zimmerman | |
| 4,776,617 | 10/1988 | Sato | |

FOREIGN PATENT DOCUMENTS 1910988  9/1969  Fed. Rep. of Germany .

Primary Examiner—Dave W. Arola
Attorney, Agent, or Firm—Michael N. Meller

[57] ABSTRACT

In order to couple in a tight and dismantlable manner the ends of two fixed, rigid tubes (10, 12), more particularly in an aircraft fuel transfer circuit, use is made of a connecting sleeve (20), whereof a first end is tightly fixed by means of a nut (30) to a half-coupling (28) welded to a first (10) of the tubes. The second end (20c) of the sleeve can tightly slide on the other tube (12), which gives access to a device (40) connecting two internal tubes (14, 16) in a double envelope circuit.

4 Claims, 3 Drawing Sheets

DEVICE FOR THE TIGHT, DISMANTLABLE COUPLING OF TWO TUBES, PARTICULARLY FOR A FUEL TRANSFER INSTALLATION

DESCRIPTION

The invention relates to a dismantlable device for the tight coupling of two fixed, rigid tubes, e.g. constituting the external tubes of a double envelope circuit.

In aircraft, the transfer of fuel from tanks to engines is ensured by rigid tubes formed from different sections coupled together in a dismantlable manner, more particularly in order to permit maintenance. The coupling devices used for this purpose must be designed so as to take account of the fact that the rigid tubes cannot generally be displaced with respect to one another. Moreover, these coupling devices must have an isostatic character, in order to take account of deformations of the circuit more particularly due to the temperature variations and stresses, as well as for taking account of angular and positional tolerances between the tubes to be connected.

Furthermore, in hot areas, a fuel leak could lead to an unacceptable flammability or ignition risk. In order to ensure that there is only a very minor leak risk, use is made in such areas of a double envelope, which drains any possible leaks from the seals of the inner envelope.

For economic reasons, the fuel transfer circuits used in aircraft are formed to the greatest possible extent from standard components. However, although this can be relatively easily realized in single envelope areas, the difficulty of obtaining dismantlable connections in double envelope areas presently involves the design and manufacture of a large number of complex parts, which are specific and costly, generally machined and all different from one another. In addition, this long procedure has to be repeated for each program and whenever a parameter changes (tube diameter, etc.), because the use of an existing connection is not possible.

These special machined parts presently necessary for producing double envelope dismantlable connections are expensive for various reasons. Firstly, these parts are complex, precise and require a high machining quality imposed by the necessary sealing or by their welding at the end of a tube. Moreover, these parts have to be machined from hard metals, such as stainless steel, when they are located in a hot area. Finally, the complexity and diversity of the presently used assemblies make said special parts too specific and therefore difficultly reusable for other installations.

The present invention is directed at a dismantlable device designed for the tight coupling of two fixed tubes, whose particular design is based on the use of a single machined part, which can ensure all the connections between tubes having the same diameter.

Thus, the invention proposes a dismantlable device for the tight coupling of two fixed tubes, characterized in that it comprises a connecting sleeve and means for the tight fixing of a first end of said sleeve to a first of the tubes, a second end of the connecting sleeve being in tight contact with the second tube, in such a way that the sleeve can slide on the latter following the dismantling of the tight fixing means.

Preferably, the first end of the sleeve has on its outer surface a seal and a shoulder set back from said seal, the second end of the sleeve has a reduced internal diameter compared with that of the internal diameter of the rest of the sleeve. The tight fixing means incorporate a half-coupling fixed to the end of the first tube and which is able to tightly receive the first end of the connecting sleeve and which has a thread on its outer surface, as well as a nut which can be screwed to the thread of the half-coupling in order to maintain the first end of the connecting sleeve in the latter, whilst bearing on said shoulder. A collar is fixed to the end of the second tube and carries a seal on its outer surface and can be tightly received in the second end of the connecting sleeve.

In such a device, only the connecting sleeve is a machined part, whereas all the other parts are of a standard nature and consequently are inexpensive. Moreover, the same connecting sleeve can be used for ensuring all the connections between the tubes of the same diameter.

The assembly and disassembly of the coupling device can take place very simply by unscrewing the nut and then sliding the connecting sleeve on the second tube. When this sliding has been carried out, access is possible to an also dismantlable, internal coupling device, in the case where the connection relates to a double envelope area of the circuit.

The invention is described in greater detail hereinafter relative to a preferred, but non-limitative embodiment and with reference to the attached drawings, wherein show:

FIG. 1: A longitudinal sectional view of a dismantlable coupling device according to the invention.

Figure 2:
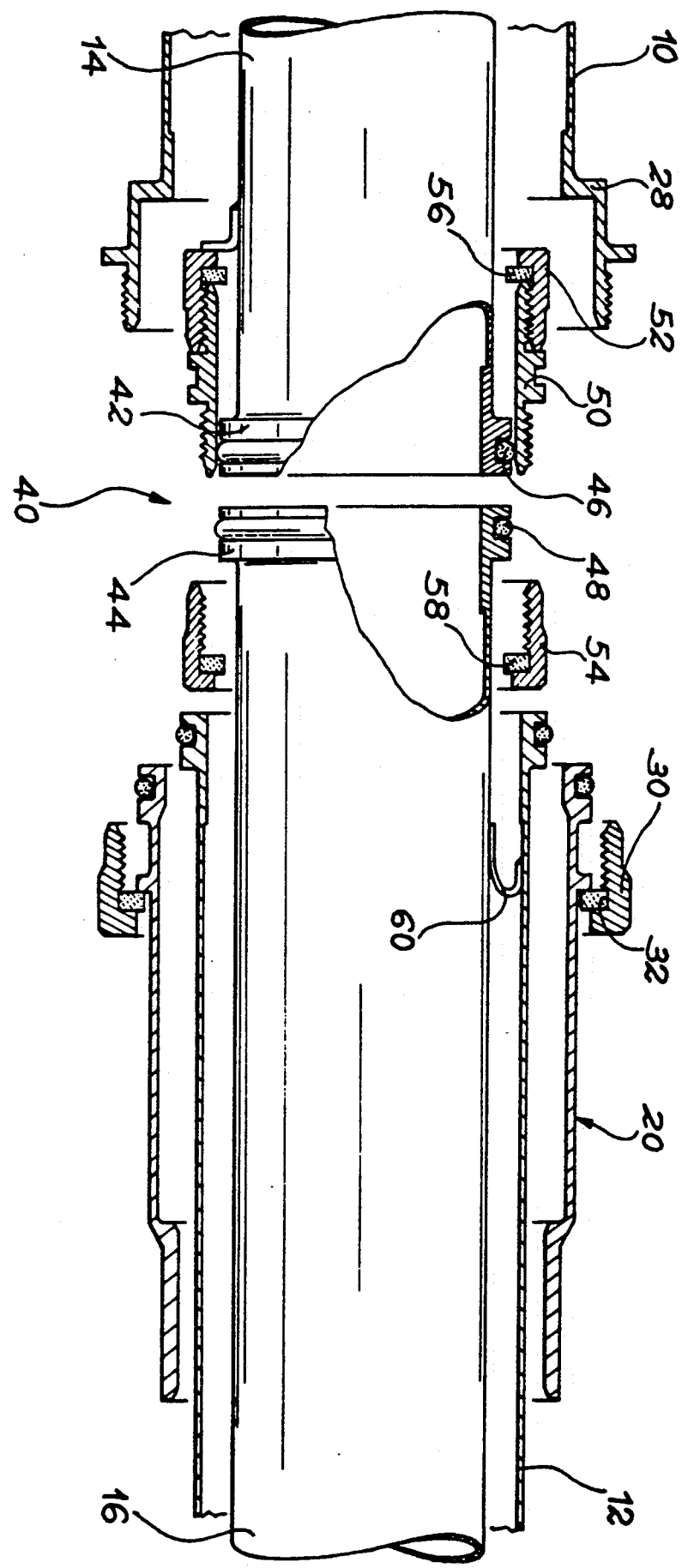

FIG. 2: A view comparable to FIG. 1 illustrating on a smaller scale the dismantling of the coupling device according to the invention giving access to an internal coupling device connecting two internal tubes in a double wall area of a circuit.

Figure 3:
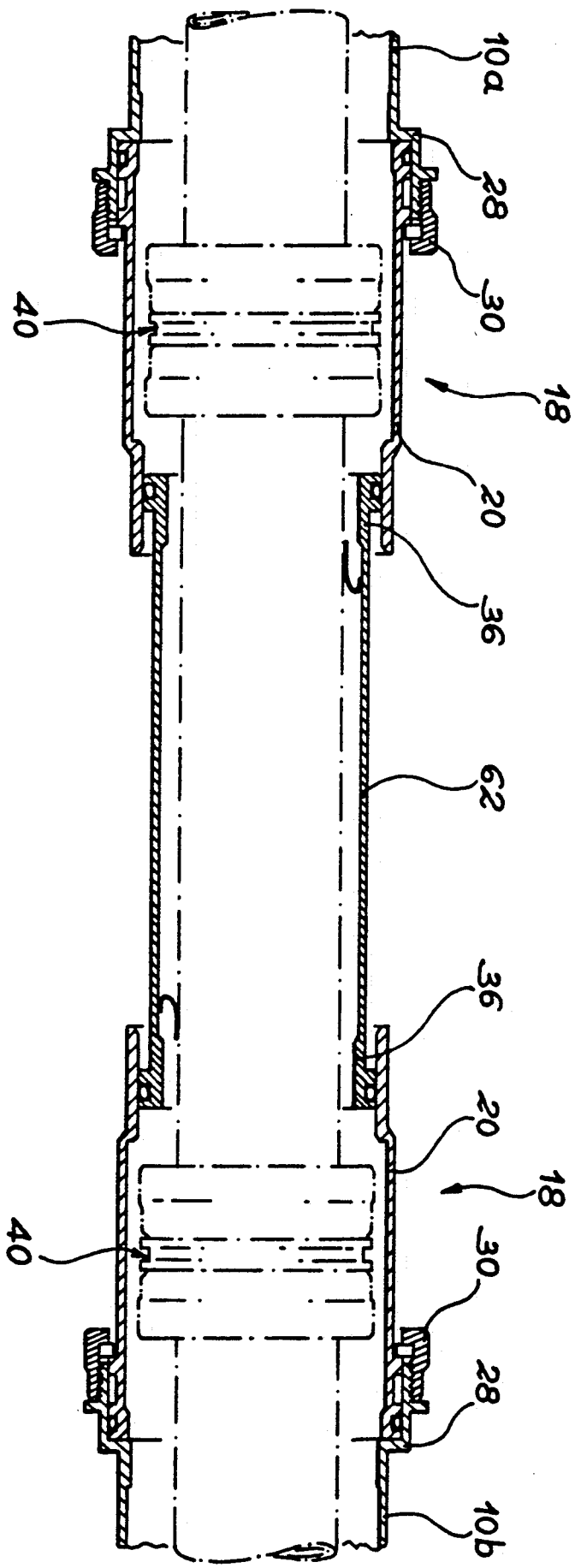

FIG. 3: On a smaller scale the coupling of two tubes with the same diameter with the aid of two coupling devices according to the invention and a smaller diameter connecting tube located between these devices.

In FIG. 1, reference numerals 10 and 12 designate the two ends, aligned in an approximate manner along the same axis, of two fixed, rigid tubes 10, 12 belonging to a fuel supply circuit for the engines of an aircraft. However, between the two ends of the tubes there can be minor angular and/or positional alignment deficiencies resulting from the assembly of these tubes in the different parts of the aircraft.

The tubes 10 and 12 can constitute either the single envelope of a single wall circuit, or the outer envelope of a double wall circuit, which then also has inner tubes 14 and 16, as shown in mixed line form in FIG. 1.

According to the invention, the ends of the tubes 10 and 12 are connected by means of a dismantlable, tight coupling device designated in general terms by the reference numeral 18. Coupling device 18 essentially comprises a connecting sleeve 20 in the form of a machined tubular part, whose internal diameter is approximately equal to that of the tube 10 and is greater than that of the tube 12.

At its end adjacent to tube 10, the connecting sleeve 20 is provided on its outer surface with an annular groove 20a in which is located an O-ring 22. A shoulder 20b is also formed on the outer surface of sleeve 20 and is slightly set back with respect to the groove 20d.

At its opposite end, adjacent to tube 12, the connecting sleeve 20 is terminated by a part 20c having a reduced internal diameter compared with the internal diameter of the remainder of sleeve 20. However, this reduced internal diameter is greater than the external diameter of tube 12, so that the connecting sleeve can be placed around the latter, as will be shown hereinafter. Apart from the connecting sleeve 20, the coupling device 18 only comprises standard parts.

One of these standard parts is a half-coupling 28, which is tightly fixed to the end of tube 10, e.g. by welding. This half-coupling 28 has an internal diameter approximately equal to the external diameter of the adjacent end of the connecting sleeve 20, on which is mounted the O-ring 22. Thus, said end of sleeve 20 can be introduced into the half-coupling 28, which ensures the centering thereof, until the terminal edge of the end of sleeve 20 bears on a shoulder formed in the half-coupling 28, as illustrated by FIG. 1. Under these conditions, the shoulder 20b formed at the corresponding end of connecting sleeve 20 is slightly outside the half-coupling 28.

In its part furthest from tube 10, the half-coupling 28 has on its outer surface a thread 28a onto which is screwed a nut 30. Nut 30 bears on the shoulder 20b of the connecting sleeve 20 via a retaining thrust washer 32. The corresponding end of the connecting sleeve 20 can consequently be tightly fixed within the half-coupling 28 by the bearing of the terminal edge of the sleeve end in the bottom of the half-coupling 28. Under these conditions, a lockwire 34 can be placed between the half-coupling 28 and the nut 30 to prevent the loosening of the latter.

The tight, dismantlable coupling device according to the invention also comprises a collar 36, which is tightly fixed to the end of tube 12, e.g. by welding. The external diameter of collar 36 is approximately equal to the internal diameter of the end 20c of the connecting sleeve 20, the length of the latter being such that collar 36 is located within said end 20c when the opposite end of the sleeve is fixed in the half-coupling 28 by nut 30. The collar 36 has on its outer surface an annular groove 36a in which is located an O-ring 38 ensuring the sealing of the connection between tube 12 and sleeve 20.

It should be noted that when the end of the connecting sleeve 20 carrying the O-ring 22 is mounted in the half-coupling 28 by means of nut 30, a slight angular and axial deflection is possible between tube 12 and sleeve 20, in order to take account of assembly tolerances and differential expansions, without the tightness of the coupling being prejudiced.

Moreover and as will be shown hereinafter, when the end of the connecting sleeve carrying O-ring 22 is disengaged from tube 10 by unscrewing nut 30, the sleeve can be completely translated on tube 12. When the tubes 10 and 12 are the external tubes of a double wall circuit also having internal tubes 14, 16 interconnected by a dismantlable, internal coupling device 40, it is possible to have easy access to the latter system by sliding sleeve 20 on tube 12. Thus, the length of the connecting sleeve 20 is chosen so as to permit easy access to the internal coupling device 40.

It has already been stated that apart from the coupling sleeve 20, all the other components of the coupling device 18 are standard components. Thus and in an exemplified manner only, the half-coupling 28 can be a NSA 840018-250 half-coupling, the nut 30 an ABS 0107-250 nut, the thrust washer 32 a NSA 840003-250 washer and the collar 36 a NSA 840017-200 collar. For the tubes 10 and 12 having a given diameter, all the connections of the same circuit can be obtained by using a single original part constituted by the sleeve 20, whereby the latter can be the same for all the circuits constituted by tubes of the same diameter.

As has already been stated, the most interesting application of the coupling device according to the invention involves the coupling of external tubes of double wall areas of aircraft fuel circuits. The particular interest of the coupling device 18 according to the invention in said application is revealed with reference to FIG. 2. It is possible to see in the latter that when the nut 30 has been unscrewed from the half-coupling 28, it is possible to slide on tube 12 the connecting sleeve 20 on which are placed the nut 30 and the thrust washer 32. The internal coupling device 40 tightly connecting the internal tubes 14 and 16 is then completely released. Under these conditions, it is easy to dismantle device 40, as illustrated in FIG. 2.

In the special embodiment illustrated in FIG. 2, the coupling device 40 comprises two collars 42, 44 respectively fixed, e.g. by welding, to the ends of tubes 14 and 16. Each of these collars has on its outer surface an annular groove, which receives an O-ring 46, 48.

Device 40 also has a ring 50, whose internal diameter is slightly larger than the external diameter of collars 42 and 44, so that the sealing of the coupling between tubes 14 and 16 is ensured by the O-rings 46, 48, when ring 50 simultaneously surrounds the collars 42, 44. At each of its ends, ring 50 has an external thread onto which can be screwed a nut 52, 54, thrust washers 56, 58 being placed between each of the nuts 52, 54 and the ring 50.

Such a coupling device is formed from standard components, which can e.g. be NSA 840017-150 components for collars 42, 44, an ABS 0108-250 component for ring 50, ABS 0107150 components for nuts 52, 54 and NSA 840003-150components for the thrust washers 56, 58.

When access to the internal coupling device 40 is permitted by the sliding of the connecting sleeve 20, in the manner illustrated in FIG. 2, one of the nuts 54 can be unscrewed, so that it is possible to slide the assembly formed by ring 50 and the other nut 52 on tube 14, in the manner illustrated by FIG. 2. The two envelopes of the circuit are then completely disconnected.

Preferably, the turning of nuts 52, 54 is prevented when the coupling has been made by a not shown lockwire identical to the wire 34 for the coupling device 18 (FIG. 1).

In per se known manner, the tubes 14, 16 can be centered within the tubes 10, 12 by the centering members 60, illustrated in FIGS. 1 and 2.

As illustrated in FIG. 3, in view of the fact that the diameter of the external tubes to be connected can be the same and in order to permit between those tubes a lateral deflection in addition to the angular and axial deflections (lateral deflection permitted as a result of the combination of two angular deflections of collars 36 within the connecting sleeves 20), it is possible to use two coupling devices 18 mounted in reverse directions and associated with one connecting tube 62. In the drawing, the tubes to be connected, which have an identical cross-section, are designated 10a and 10b. The connecting tube 62 then has a diameter smaller than that of the tubes 10a, 10b and each of its ends carries a collar 36, on which can tightly slide the end of a connecting sleeve 20. The opposite end of each of the connecting sleeves 20 is fixed in a half-coupling 28 respectively welded to the end of tube 10a and to the end of tube 10b by a respective nut 30. In this case, an internal coupling device 40 is placed within each of the sleeves 20.

I claim:

1. A dismantlable external device for the tight coupling of first and second external tubes, surrounding first and second internal tubes connected by a dismantlable internal coupling device, said dismantlable external device comprising a connecting sleeve and means for the tight fixing of a first end of said sleeve to the first external tube, a second end of the connecting sleeve being in tight contact with the second external tube, in such a way that the sleeve can slide on the latter following the dismantling of the tight fixing means, thus allowing a free access to the dismantlable internal coupling device.

2. Device according to claim 1, wherein the first end of the sleeve has on its outer surface a seal and a shoulder set back with respect to said seal, the second end of the sleeve having a reduced internal diameter compared with the internal diameter of the remainder of the sleeve, the tight fixing means having a half-coupling fixed to the end of the first tube and able to tightly receive the first end of the connecting sleeve and having a thread on its outer surface, as well as a nut which can be screwed to the thread of the half-coupling in order to maintain the first end of the connecting sleeve in the latter, whilst bearing on said shoulder, a collar being fixed to the end of the second tube, said collar carrying a seal on its outer surface and can be tightly received in the second end of the connecting sleeve.

3. Device according to claim 2, wherein a thrust washer is interposed between the nut and the shoulder.

4. Device according to claim 2, wherein the second tube is a connecting tube carrying a collar at each of its ends, said connecting tube being tightly coupled to two first tubes having the same diameter by two connecting sleeves mounted in opposite directions.

* * * * *